Patented July 14, 1953

2,645,593

UNITED STATES PATENT OFFICE 2,645,593

QUATERNARY AMMONIUM NAPHTHENATE AND METHOD OF MAKING THE SAME

Archibald Mortimer Erskine, Berkeley, Calif.

No Drawing. Application February 9, 1951,
Serial No. 210,293

16 Claims. (Cl. 167—30)

The present invention relates to a composition of matter having strong anti-microorganismal powers and especially bactericidal powers and to a method of making it.

I have produced a new composition N-alkyl-benzyl-trimethyl ammonium naphthenate having the formula

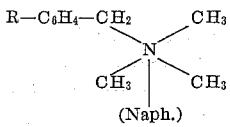

in which R is an alkyl group between $C_8H_{17}$ and $C_{18}H_{37}$ and characterized by a high phenol co-efficient compared with other known quaternary ammonium compounds. I have found this compound to be highly effective in destroying or inhibiting the growth of microorganisms and particularly bacteria.

The quaternary ammonium naphthenate of the present invention is soluble in a wide range of organic solvents, including alcohols, ethers, aliphatic and aromatic hydrocarbons, oxygenated solvents and chlorinated solvents. In general, it may be referred to as an oil-soluble quaternary ammonium salt. Although water insoluble, it shows remarkable self-emulsifying properties in water. For example, a 2% emulsion, prepared by simple shaking with water without use of extraneous emulsifying agents appeared perfectly stable and gave no sign of coagulation on standing over a period of six months.

Moreover, the quaternary ammonium naphthenate of the present invention can be "solubilized" in aqueous solution by the use of certain solubilizing agents. "Solubilized" aqueous solutions may be prepared by the use of certain non-ionic surface active agents, such as Tween 20 (polyoxyethylene sorbitan monolaurate). Although transparent and relatively stable, these "solutions" appear to be colloidal dispersions. The unique solubility or dispersion properties of my improved product permit it to assume many desirable commercial forms. For example, my new product may assume the liquid forms of aqueous self-emulsions, "solubilized" aqueous preparations and solutions in organic solvents to serve as bactericides, bacteriostatic agents, fungicides, algaestatic agents and algaecides. More specially, my new product may be incorporated in ointments and pastes, powders, lotions (based on high solubility in alcohols) and sprays (aerosol type, using organic solvents).

The compound of the present invention also has marked surface active properties due to the fact that it contains strongly hydrophobic groups in both positive and negative radicals.

The composition of the present invention is desirably made by reacting an aqueous solution of a N-alkylbenzyl-trimethyl ammonium salt with an aqueous solution of a salt of naphthenic acid. The anion of the ammonium salt and the cation of the salt of naphthenic acid are such that when combined, they produce a water soluble by-product. More specifically, the N-alkylbenzyl trimethyl ammonium salt has desirably a chloride or bromide anion and the salt of naphthenic acid has an alkali metal such as sodium or potassium or an ammonium radical as a cation. These reacting compositions have the property of being soluble in water and of producing a water insoluble reaction product. The crude reaction product, either in the form of an emulsion or as a separate oil phase is conveniently extracted with ether or other suitable water immiscible solvent. Evaporation of the solvent and of the retained water from the extract permits ready isolation of the N-alkylbenzyl-trimethyl ammonium naphthenate.

My reactants are used in aqueous solutions of high dilutions. The dilution is at least high enough to dissolve all of the sodium chloride or other salt by-product formed. The dilution of the reaction mixture thereby causes efficient removal in the aqueous phase of the sodium chloride or other salt by-product produced by the reaction.

The use of a water immiscible solvent for the extraction of the main reaction product facilitates recovery of the latter and its complete separation from the salt by-product. These concurrent factors lead to the isolation of the main naphthenate product in a pure form containing a minimum of chloride or other contaminant salt by-product.

The process of the present invention is distinguished by its simplicity and convenience, by its maximum recovery of the main reaction product, by its facilitation of solvent recovery, by its efficient removal of the sodium chloride or other salt by-product and by the purity of the main product.

The following example illustrates a certain way in which the method of the present invention has been applied but is not to be construed as limiting the broader aspects of the invention.

A solution of sodium naphthenate is prepared by dissolving 13.2 grams of naphthenic acid $C_{12}H_{21}CH_2COOH$ (combining weight of 224) in 1 liter of water containing 2.3 grams of caustic soda. To this solution is added with stirring 600 ml. of an aqueous solution containing 21.5 grams (0.06 mol) of N-alkylbenzyl-trimethyl ammonium chloride

$(C_8H_{17} \text{ to } C_{18}H_{37}) \cdot C_6H_4 \cdot CH_2—N \equiv (CH_3)_3 \cdot Cl$ This quaternary ammonium salt may be obtained commercially in the form of its 50% aqueous solution as ATM-50 (Oronite, Standard Oil of California). This is a mixture of quaternary ammonium salts which are similar except that the long alkyl groups vary from $C_8H_{17}$ to $C_{18}H_{37}$ and include the alkyl group $C_{12}H_{25}$, the average alkyl group being $C_{12}H_{25}$.

The white emulsion which is formed by the reaction is extracted by shaking with 900 ml. of ether. After separating the upper pale yellow ether layer from the water-white aqueous layer, the ether layer is evaporated. The temperature is allowed to rise sufficiently high to eliminate residual moisture. The product, N-alkylbenzyl-trimethyl ammonium naphthenate

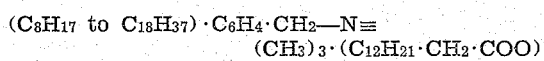
$(C_8H_{17} \text{ to } C_{18}H_{37}) \cdot C_6H_4 \cdot CH_2—N \equiv (CH_3)_3 \cdot (C_{12}H_{21} \cdot CH_2 \cdot COO)$ is obtained in a 30.0 gram yield as a thick pale yellow syrup.

When the product obtained by the above process was tested against *Staphylococcus aureus* by the Food and Drug Administration method using "Letheen" broth as the subculture medium, it gave the exceedingly high value of 625 for phenol coefficient. Stated in other terms, the compound kills this type of bacteria at a dilution of 1:50,000 as compared with a dilution of 1:80 for phenol.

The method followed to determine phenol coefficient was the official one set up by the Food and Drug Administration, U. S. Department of Agriculture, and described in Circular No. 198, December 1931. The test indicated above was carried out with an accepted modification of the F. D. A. method, in which "Letheen" broth was used for the subculture and compares with a phenol coefficient of only 200 for dodecyl dimethyl benzyl ammonium naphthenate.

When my product was tested for fungicidal properties against *Trychophyton rosaceum*, it was found that when used at a dilution of 1 to 2000 it killed this organism in ten minutes.

A test for algaestatic properties indicated that my compound is effective against a pure culture of chlorella at a concentration of 10 parts per million.

While the invention has been described with particular reference to specific embodiments, it is to be understood that it is not to be limited thereto but is to be construed broadly and restricted solely by the scope of the appended claims.

What is claimed is:

1. N-alkylbenzyl-trimethyl ammonium naphthenate having the formula

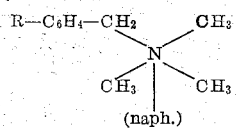
(naph.)

in which R is an alkyl group between $C_8H_{17}$ and $C_{18}H_{37}$.

2. An anti-microorganismal agent comprising in effective amounts in aqueous self-emulsion N-alkylbenzyl-trimethyl ammonium naphthenate, in which the alkyl group ranges between $C_8H_{17}$ and $C_{18}H_{37}$.

3. An anti-microorganismal agent comprising in effective amounts in an organic solvent N-alkylbenzyl-trimethyl ammonium naphthenate, in which the alkyl group ranges between $C_8H_{17}$ and $C_{18}H_{37}$.

4. A preparation as described in claim 3, wherein the organic solvent is an alcohol.

5. An anti-microorganismal agent comprising N-alkylbenzyl-trimethyl ammonium naphthenate, in which the alkyl group ranges between $C_8H_{17}$ and $C_{18}H_{37}$ in effective amounts in water in the presence of a non-ionic surface active agent to form a colloidal dispersion.

6. N-dodecylbenzyl-trimethyl ammonium naphthenate.

7. A process of producing N-alkylbenzyl-trimethyl ammonium naphthenate, comprising reacting an aqueous solution of a N-alkylbenzyl-trimethyl ammonium salt in which the alkyl group ranges between $C_8H_{17}$ and $C_{18}H_{37}$ with an aqueous solution of a salt of naphthenic acid in the absence of any water-miscible solvent aside from water to produce a water insoluble reaction product.

8. A process as described in claim 7, wherein the anion and the cation of the reactants are such as to produce a reaction by-product soluble in water.

9. A process as described in claim 7, wherein the anion of the N-alkylbenzyl-trimethyl ammonium salt is a halide and the cation of the salt of naphthenic acid is an alkali metal.

10. A process as described in claim 7, wherein the anion of the N-alkylbenzyl-trimethyl ammonium salt is a halide and the cation of the salt of naphthenic acid is an ammonium radical.

11. A process of producing N-alkylbenzyl-trimethyl ammonium naphthenate comprising reacting an aqueous solution of N-alkylbenzyl-trimethyl ammonium chloride with an aqueous solution of sodium naphthenate in the absence of any water-miscible solvent aside from water to produce a water insoluble reaction product.

12. A process of producing N-alkylbenzyl-trimethyl ammonium naphthenate, comprising reacting an aqueous solution of an N-alkylbenzyl-trimethyl ammonium salt in which the alkyl group ranges between $C_8H_{17}$ and $C_{18}H_{37}$ with an aqueous solution of a salt of naphthenic acid in the absence of any water-miscible solvent aside from water to produce a water insoluble reaction product, and extracting the reaction product with a water immiscible solvent.

13. A process as described in claim 12, wherein the extracting solvent is ether.

14. A process as described in claim 7, the dilution of the reactants in water being high enough to dissolve entirely the salt by-product in the water.

15. A process of producing N-alkylbenzyl-trimethyl ammonium naphthenate, comprising reacting an aqueous solution of N-alkylbenzyl-trimethyl ammonium chloride in which the alkyl group ranges between $C_8H_{17}$ and $C_{18}H_{37}$ with an aqueous solution of sodium naphthenate in the absence of any water-miscible solvent aside from water to produce a water insoluble reaction product, the dilution of the reactants being high enough to dissolve entirely the sodium chloride by-product, extracting the reaction product with ether, and separating the reaction product from the ether.

16. The method of combatting bacteria, fungi and algae which comprises treating matter liable to attack by said bacteria, fungi and algae with a composition containing as an active ingredient N-alkylbenzyl-trimethyl ammonium naphthenate, in which the alkyl group ranges between $C_8H_{17}$ and $C_{18}H_{37}$.

ARCHIBALD MORTIMER ERSKINE.

References Cited in the file of this patent

UNITED STATES PATENTS

| Number | Name | Date |
|---|---|---|
| 2,271,707 | Munz et al. | Feb. 3, 1942 |
| 2,272,525 | Jones | Feb. 10, 1942 |
| 2,314,111 | Tucker et al. | Nov. 16, 1943 |
| 2,424,158 | Fugua et al. | July 15, 1947 |
| 2,519,924 | Nowak | Aug. 22, 1950 |
| 2,544,732 | Shechmeister | Nov. 13, 1951 |
| 2,569,408 | de Benneville | Sept. 25, 1951 |

FOREIGN PATENTS

| Number | Country | Date |
|---|---|---|
| 499,203 | Great Britain | Jan. 16, 1939 |